US012802285B2

(12) United States Patent
Yang et al.

(10) Patent No.: US 12,802,285 B2
(45) Date of Patent: Nov. 17, 2026

(54) POINT CLOUD DATA PREPROCESSING METHOD, POINT CLOUD GEOMETRY CODING METHOD AND APPARATUS, AND POINT CLOUD GEOMETRY DECODING METHOD AND APPARATUS

(71) Applicant: Honor Device Co., Ltd., Shenzhen (CN)

(72) Inventors: Fuzheng Yang, Shenzhen (CN); Wei Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 508 days.

(21) Appl. No.: 18/267,977

(22) PCT Filed: Feb. 7, 2022

(86) PCT No.: PCT/CN2022/075379
§ 371 (c)(1),
(2) Date: Jun. 16, 2023

(87) PCT Pub. No.: WO2022/166957
PCT Pub. Date: Aug. 11, 2022

(65) Prior Publication Data
US 2024/0062429 A1 Feb. 22, 2024

(30) Foreign Application Priority Data
Feb. 8, 2021 (CN) ......................... 202110180985.0

(51) Int. Cl.
*G06T 9/40* (2006.01)
*G06T 3/073* (2024.01)
*G06T 5/80* (2024.01)

(52) U.S. Cl.
CPC ................ *G06T 9/40* (2013.01); *G06T 3/073* (2024.01); *G06T 5/80* (2024.01)

(58) Field of Classification Search
CPC .. G06T 9/40; G06T 3/073; G06T 5/80; G06T 2210/56; G06T 17/005; G06T 2207/10028; H04N 19/70; H04N 19/85
See application file for complete search history.

(56) References Cited

U.S. PATENT DOCUMENTS 10,939,123 B2 3/2021 Li et al.
11,310,525 B2 * 4/2022 Lasserre .............. H04N 19/184
(Continued)

FOREIGN PATENT DOCUMENTS

CN 108632607 A 10/2018
CN 109214982 A 1/2019
(Continued)

OTHER PUBLICATIONS

Oh et al., "[G-PCC] [new proposal] Coordinate conversion for attribute coding of cat3—frame data," 130. MPEG Meeting, Alpbach, AT (Motion Picture Expert Group or ISO/IEC JTC1/SC29/WG11), No. M53613, 4 pages (Apr. 15, 2020).
(Continued)

*Primary Examiner* — Dramos Kalapodas
(74) *Attorney, Agent, or Firm* — Leydig, Voit & Mayer, Ltd.

(57) ABSTRACT

A point cloud data preprocessing method, a point cloud geometry coding method and apparatus, and a point cloud geometry decoding method and apparatus are disclosed. The preprocessing method includes: performing coordinate conversion on original point cloud data to obtain a representation of an original point cloud in a cylindrical coordinate system; unfolding the cylindrical coordinate system to obtain a two-dimensional structure; and performing regularization processing on the two-dimensional structure based on a geometric distortion measure to obtain a regularized structure. The coding method includes: performing predic-
(Continued)

tive coding on preprocessed original point cloud data to obtain a geometric information bitstream.

6 Claims, 4 Drawing Sheets

(56) References Cited

U.S. PATENT DOCUMENTS

| | | | | |
|---|---|---|---|---|
| 11,507,193 | B2 * | 11/2022 | Bradski | H04N 13/204 |
| 12,069,316 | B2 * | 8/2024 | Oh | H04N 19/91 |
| 2019/0156520 | A1 * | 5/2019 | Mammou | G08B 1/00 |
| 2020/0021847 | A1 * | 1/2020 | Kim | H04N 19/597 |
| 2021/0006833 | A1 * | 1/2021 | Tourapis | G06T 9/001 |
| 2021/0218969 | A1 * | 7/2021 | Lasserre | H04N 19/517 |
| 2023/0388557 | A1 * | 11/2023 | Oh | H04N 19/96 |

FOREIGN PATENT DOCUMENTS

| | | | |
|---|---|---|---|
| WO | 2020189943 | A1 | 9/2020 |
| WO | 2022075786 | A1 | 4/2022 |

OTHER PUBLICATIONS

Mammou et al., "[G-PCC] [New proposal] Optimization of the predictive coding scheme for Spinning Lidars," 130. MPEG Meeting, Alpbach, AT (Motion Picture Expert Group or ISO/IEC JTC1/SC29/WG11), No. m53618, 6 pages (Apr. 15, 2020).

Gao et al., "[G-PCC] [New proposal] Predictive Geometry Coding," 128. MPEG Meeting, Geneva, CH (Motion Picture Expert Group or ISO/IEC JTC1/SC29/WG11), No. m51012, 10 pages (Oct. 6, 2019).

Ostermann, Jörn. "G-PCC codec description v8," 131. MPEG Meeting, Online, (Motion Picture Expert Group or ISO/IEC JTC 1/SC 29/WG 11), No. N19525, 140 pages (Oct. 10, 2020).

Lasserre et al., "[GPCC][CE 13.22 related] An improvement of the planar coding mode," 128. MPEG Meeting, Geneva, (Motion Picture Expert Group or ISO/IEC JTC1/SC29/WG11), No. m50642, 33 pages (Oct. 2, 2019).

Iguchi et al., "[G-PCC][New] Predictive geometry angular mode using spherical LiDAR data input," 132. MPEG Meeting, Online, (Motion Picture Expert Group or ISO/IEC JTC1/SC29/WVG7), No. m55361, 4 pages (Oct. 7, 2020).

* cited by examiner

POINT CLOUD DATA PREPROCESSING METHOD, POINT CLOUD GEOMETRY CODING METHOD AND APPARATUS, AND POINT CLOUD GEOMETRY DECODING METHOD AND APPARATUS

CROSS-REFERENCE TO RELATED APPLICATIONS

This application is a national stage of International Application No. PCT/CN2022/075379, filed on Feb. 7, 2022, which claims priority to Chinese Patent Application No. 202110180985.0, filed on Feb. 8, 2021. The disclosures of both of the aforementioned application are hereby incorporated by reference in their entireties.

TECHNICAL FIELD

The present disclosure belongs to the field of point cloud data processing technologies, and in particular, to a point cloud data preprocessing method, a point cloud geometry coding method and apparatus, and a point cloud geometry decoding method and apparatus.

BACKGROUND

In a point cloud G-PCC (geometry-based point cloud compression) coder framework, geometric information of a point cloud and attribute information corresponding to each point are coded separately. At present, geometry coding and decoding of the G-PCC can be divided into geometry coding and decoding based on an octree and geometry coding and decoding based on a prediction tree. The geometry coding based on a prediction tree first sequences inputted point clouds, and establishes a prediction tree structure in two different manners at a coding side. Then, based on the prediction tree structure, each node in the prediction tree is traversed, geometric position information of the nodes is predicted by selecting different prediction modes to obtain a predicted residual, and the geometric predicted residual is quantified by using quantization parameters. Finally, through continuous iteration, the predicted residual of the position information of prediction tree nodes, the prediction tree structure, and the quantization parameters are coded to generate a binary bitstream.

Prediction tree coding based on lidar calibration information is a currently commonly used geometry coding manner. For each laser scanner of the lidar, collection points belonging to a same laser scanner should be regularly distributed in a cylindrical coordinate system. However, due to factors such as noise, a measurement error, and a jitter of a device, actual data presents a non-uniform distribution, resulting in poor correlation between the data, low prediction accuracy, and low coding efficiency.

However, the point cloud coding and decoding technology based on a prediction tree establish a tree structure by using only some parameters of a lidar device. The tree structure does not fully reflect the spatial correlation of the point cloud, which is not conducive to the prediction and entropy coding of the point cloud, thereby affecting coding efficiency. However, an existing G-PCC method determines a relationship between each point and the laser scanner only through correction in the vertical direction, which results in that other variables need to be introduced to assist the coding of horizontal information upon coding, increasing the amount of information that needs to be coded, and reducing geometry coding efficiency.

SUMMARY

To resolve the foregoing problems in the existing technology, the present disclosure provides a point cloud geometry prediction coding method and apparatus, and a point cloud geometry prediction decoding method and apparatus based on a regularized structure. The technical problems to be resolved in the present disclosure is implemented by the following technical solutions.

A point cloud data preprocessing method is provided, including:

- performing coordinate conversion on original point cloud data to obtain a representation of an original point cloud in a cylindrical coordinate system;
- unfolding the cylindrical coordinate system to obtain a two-dimensional structure; and
- performing regularization preprocessing on the two-dimensional structure based on a geometric distortion measure to obtain a regularized structure.

In an embodiment of the present disclosure, the performing regularization preprocessing on the two-dimensional structure based on a geometric distortion measure to obtain a regularized structure includes:

- adjusting the two-dimensional structure based on a point-to-plane geometric distortion measure to obtain the regularized structure.

In an embodiment of the present disclosure, the adjusting the two-dimensional structure based on a point-to-plane geometric distortion measure to obtain the regularized structure includes:

- searching for a point closest to a current node in directions of an azimuth angle and a pitch angle in the two-dimensional structure;
- constructing a ray emitted from an origin based on angle information of the point closest to the current node;
- constructing a plane based on the current node and a normal of the current node;
- obtaining an intersection of the ray and the plane, and recording a distance between the origin and the intersection;
- using the distance as a radius of the current node to a center after regularization; and
- repeating the foregoing steps to complete processing of all points to obtain the regularized structure of the original point cloud data.

In an embodiment of the present disclosure, the performing regularization preprocessing on the two-dimensional structure based on a geometric distortion measure to obtain a regularized structure further includes:

- adjusting the two-dimensional structure based on a point-to-point geometric distortion measure to obtain the regularized structure; or
- adjusting the two-dimensional structure based on a point-to-point and point-to-plane comprehensive distortion measure to obtain the regularized structure; or
- adjusting the two-dimensional structure based on a point-to-line geometric distortion measure to obtain the regularized structure.

Another embodiment of the present disclosure further provides a point cloud geometry coding method, including:

- obtaining original point cloud data;
- performing regularization preprocessing on the original point cloud data by using the preprocessing method according to the foregoing embodiment to obtain a regularized structure;
- determining a prediction mode for each point in the regularized structure, and performing geometric prediction on each point by using the selected prediction mode to obtain to-be-coded information; and sequentially coding the to-be-coded information to obtain a geometric information bitstream.

In an embodiment of the present disclosure, the determining a prediction mode for each point in the regularized structure, and performing geometric prediction on each point by using the selected prediction mode to obtain to-be-coded information includes:

establishing a prediction tree structure based on lidar calibration information;

selecting a prediction mode for each point according to the prediction tree structure;

performing geometric prediction on each point in the prediction tree structure according to the selected prediction mode, to obtain a geometric predicted residual of each point; and using the geometric predicted residual as part of the to-be-coded information.

In an embodiment of the present disclosure, the performing geometric prediction on each point in the prediction tree structure according to the selected prediction mode, to obtain a geometric predicted residual of each point includes:

predicting cylindrical coordinates (r,j,i) of a current node according to a type of the current node and the selected prediction mode, to obtain a predicted value (r',j',i') and a predicted residual $(r_r,r_j,r_i)$ of the current node in a cylindrical coordinate system, where a predicted value j' of an azimuth angle of the current node is calculated according to the following formula:

$$j'=j_{prev}+n;$$

where $j_{prev}$ represents a predicted azimuth angle of the current node; n represents a quantity of points that need to be skipped between a parent node and the current node according to a scanning speed, the predicted residual $\hat{n}$ is $\hat{n}=n-n'$, and n' represents a quantity of points that need to be skipped by coded nodes adjacent to the current node; and performing difference prediction according to Cartesian coordinates (x,y,z) and predicted Cartesian coordinates $(\hat{x},\hat{y},\hat{z})$ of the current node to obtain a predicted residual $(r_x,r_y,r_z)$ in a Cartesian coordinate system.

Another embodiment of the present disclosure further provides a point cloud geometry coding apparatus, including:

a first data obtaining module, configured to obtain original point cloud data;

a regularization module, configured to perform regularization preprocessing on the original point cloud data to obtain a regularized structure;

a first prediction module, configured to determine a prediction mode for each point in the regularized structure, and perform geometric prediction on each point by using the selected prediction mode to obtain to-be-coded information; and a coding module, configured to sequentially code the to-be-coded information to obtain a geometric information bitstream.

Still another embodiment of the present disclosure further provides a point cloud geometry decoding method, including:

obtaining a geometric information bitstream and decoding the geometric information bitstream to obtain decoded data, where the decoded data includes a prediction mode for a current node;

performing geometric prediction on the current node according to the prediction mode to obtain predicted residuals, where the predicted residuals include a predicted residual in a cylindrical coordinate system and a predicted residual in a Cartesian coordinate system;

reconstructing a prediction tree structure according to the predicted residual in the cylindrical coordinate system, and performing coordinate conversion on points in the prediction tree structure to obtain predicted Cartesian coordinates of the current node; and reconstructing a point cloud according to the predicted residual in the Cartesian coordinate system and the predicted Cartesian coordinates to obtain reconstructed point cloud data.

Still another embodiment of the present disclosure further provides a point cloud geometry decoding apparatus, including:

a second data obtaining module, configured to obtain a geometric information bitstream and decode the geometric information bitstream to obtain decoded data, where the decoded data includes a prediction mode for a current node;

a second prediction module, configured to perform geometric prediction on the current node according to the prediction mode to obtain predicted residuals, where the predicted residuals include a predicted residual in a cylindrical coordinate system and a predicted residual in a Cartesian coordinate system;

a prediction tree reconstruction module, configured to reconstruct a prediction tree structure according to the predicted residual in the cylindrical coordinate system, and perform coordinate conversion on points in the prediction tree structure to obtain predicted Cartesian coordinates of the current node; and a point cloud reconstruction module, configured to reconstruct a geometric point cloud according to a geometric predicted value of the current node and the predicted residual to obtain reconstructed point cloud data.

Beneficial effects of the present disclosure are as follows.

1. According to the point cloud data processing method provided in the present disclosure, an original inputted point cloud is subjected to regularization preprocessing, so that the point cloud presents regularized distribution in horizontal and vertical directions, which better reflects a spatial correlation of the point cloud, so as to facilitate further processing of the point cloud data.
2. In the present disclosure, when regularization processing is performed, a two-dimensional structure is adjusted by using a geometric distortion measure, which ensures the quality of a point cloud model.
3. According to the point cloud geometry coding method provided in the present disclosure, when the point cloud data is preprocessed, regularization processing is performed in a direction of an azimuth angle of the point cloud, so that there is no need to use additional bitstreams to code auxiliary information in the direction of the azimuth angle upon coding, which saves bitstreams and improves coding efficiency.
4. In the present disclosure, when geometry coding is performed on a regularized point cloud, horizontal and vertical directions are combined by effectively utilizing a regularized structure, to perform predictive coding, thereby improving geometry coding efficiency.

The following further describes the present disclosure in detail with reference to accompanying drawings and embodiments.

DESCRIPTION OF EMBODIMENTS

The present disclosure is further described below in detail with reference to specific embodiments, but implementations of the present disclosure are not limited thereto.

Embodiment 1

Figure 1:
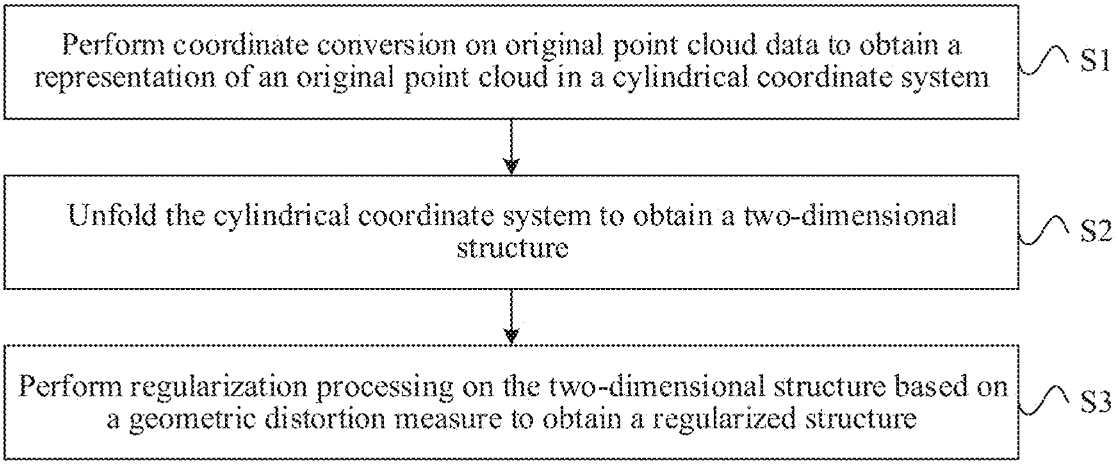
FIG. 1 is a schematic diagram of a point cloud data preprocessing method according to an embodiment of the present disclosure.

FIG. 1 is a schematic diagram of a point cloud data preprocessing method according to an embodiment of the present disclosure, and the method includes:

S1: Perform coordinate conversion on original point cloud data to obtain a representation of an original point cloud in a cylindrical coordinate system.

Specifically, the original point cloud data usually consists of a set of three-dimensional space points, and each space point records its own geometric position information, and additional attribute information such as color information, reflectivity information, and normal information. The geometric position information of the point cloud is usually represented based on a Cartesian coordinate system, that is, represented by x, y, and z coordinates of the point. The original point cloud data may be obtained through a 3D scanning device such as a lidar, or may be obtained through public datasets provided by various platforms. In this embodiment, it is assumed that the obtained geometric position information of the original point cloud data is represented based on the Cartesian coordinate system as (x,y,z) It should be noted that a representation method of the geometric position information of the original point cloud data is not limited to Cartesian coordinates.

Specifically, before performing coordinate conversion on the original point cloud, quantization processing and reordering processing may further be performed on the original point cloud, so as to facilitate subsequent predictive coding.

Figure 2:
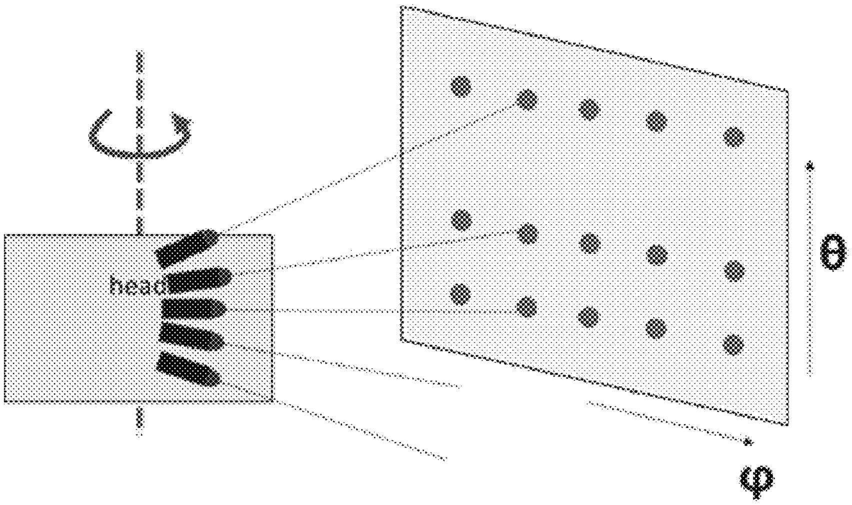
FIG. 2 is a schematic structural diagram of a lidar according to an embodiment of the present disclosure.

FIG. 2 is a schematic structural diagram of a lidar according to an embodiment of the present disclosure. The lidar consists of a plurality of laser scanners. When a lidar is described, the so-called "line number" is a quantity of laser scanners included in the lidar. The laser scanners are distributed along both sides of the central axis of the lidar with different pitch angles $\theta_i$, so that spatial information of different objects in the vertical direction in space can be obtained. Each laser scanner can be regarded as a relatively independent collection system. During collection, through the rotation of a base, all laser scanners obtain position information of the objects in space according to a certain sampling rate.

In this embodiment, Cartesian coordinates (x,y,z) of the original point cloud data can be converted into cylindrical coordinates (r,ϕ,i) according to an existing conversion formula, to obtain a representation of the original point cloud in a cylindrical coordinate system.

Figure 3:
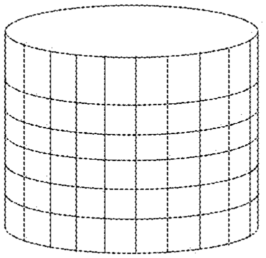
FIG. 3 is a schematic structural diagram of distribution of original collected data according to an embodiment of the present disclosure.

FIG. 3 is a schematic structural diagram of distribution of original collected data in a cylindrical coordinate system according to an embodiment of the present disclosure. In an ideal situation, point cloud data obtained by a lidar presents a uniform distribution in directions of an azimuth angle and a pitch angle in the cylindrical coordinate system. However, due to factors such as noise, mechanical jitters, and the alignment of an internal coordinate system of the lidar, the point cloud presents a characteristic of non-uniform distribution.

S2: Unfold the cylindrical coordinate system to obtain a two-dimensional structure.

In this embodiment, a pitch angle θ and an azimuth angle φ of each point after regularization are first determined by using the structure and collection parameters of the lidar. The pitch angle θ may be directly obtained from a vertical collection range of each laser scanner in a calibration file, while the azimuth angle φ needs to be determined based on a sampling interval $\varphi_{sample}$.

Figure 4:
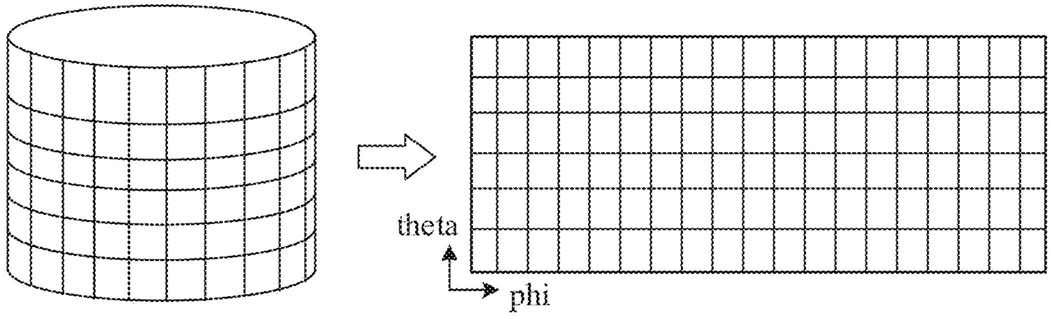
FIG. 4 is an unfolded diagram of a cylindrical coordinate system according to an embodiment of the present disclosure.

Specifically, FIG. 4 is an unfolded diagram of a cylindrical coordinate system according to an embodiment of the present disclosure. A vertical interval and a horizontal interval may become a concept similar to resolution in an image. Therefore, a vertical resolution theta and a horizontal resolution phi are respectively:

$$\text{theta} = laserNum;$$

and $$\text{phi} = \frac{360}{\varphi_{sample}}.$$

S3: Perform regularization preprocessing on the two-dimensional structure based on a geometric distortion measure to obtain a regularized structure.

After the vertical resolution and the horizontal resolution is determined in step S2, it is further necessary to determine a radius r of each point to a center after regularization.

The selection of the radius directly determines whether the regularized point cloud can maintain a same geometric structure as an inputted point cloud. In addition, for applications such as recognition and automatic driving, the distortion of the geometric structure directly determines the performance of such applications. Therefore, to reduce geometric structural distortion of a model as much as possible, this embodiment uses an idea of geometric distortion measure to perform nearest neighbor interpolation to calculate an r component of a corresponding point after regularization processing, so as to ensure that the distortion of the geometric reconstruction quality in D2 (point-to-plane) can be controlled within a certain range.

In this embodiment, the two-dimensional structure may be adjusted based on a point-to-plane geometric distortion measure (D2) to obtain a regularized structure.

Figure 5:
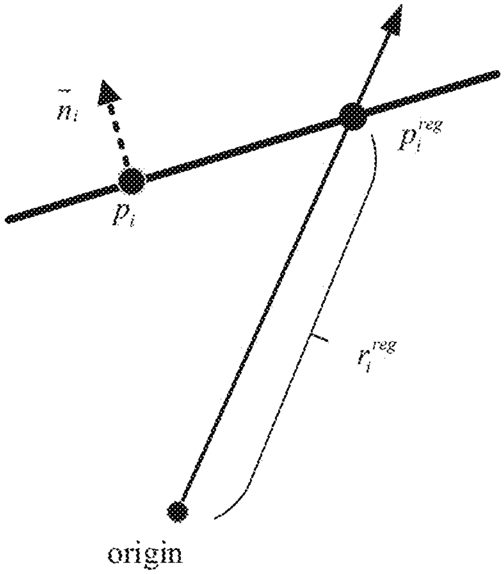
FIG. 5 is a schematic diagram of point-to-plane interpolation processing according to an embodiment of the present disclosure.

FIG. 5 is a schematic diagram of point-to-plane interpolation processing according to an embodiment of the present disclosure. Specifically, 1. first search for a point closest to a current node in directions of an azimuth angle and a pitch angle in the two-dimensional structure;
2. construct a ray emitted from an origin based on angle information of the point;
3. construct a plane based on a current node p, and a normal of the current node;
4. obtain an intersection of the ray and the plane, and record a distance between the origin and the intersection;
5. use the distance as a radius of the current node to a center after regularization, that is, the r component in cylindrical coordinates; and
6. repeat the foregoing steps to complete processing of all points to obtain the regularized structure of the original point cloud data.

Figure 6:
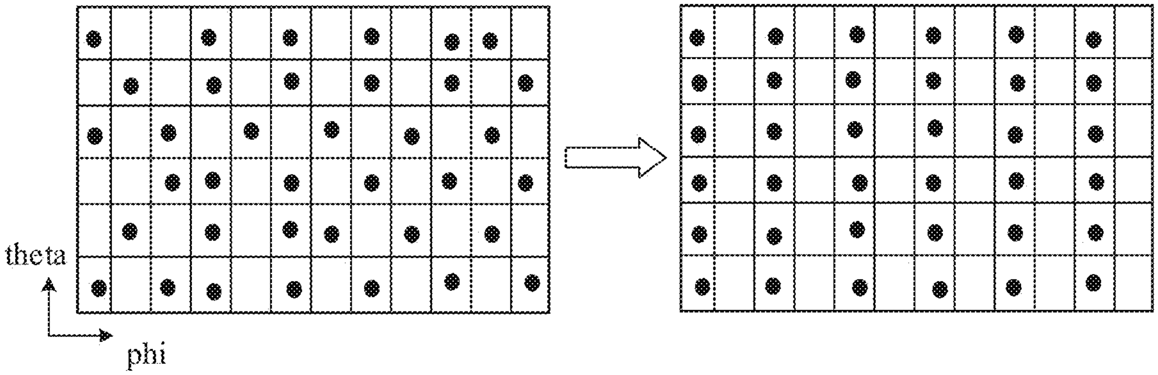
FIG. 6 is a comparison diagram before and after regularization processing according to an embodiment of the present disclosure.

In this case, the regularization preprocessing of the cylindrical coordinates (r,ϕ,i) of the point cloud is completed, and regularized coordinates (r,j,i) are obtained. FIG. 6 is a comparison diagram before and after regularization processing according to an embodiment of the present disclosure.

In this embodiment, based on the regularized structure constructed through the foregoing steps, the distortion of each point to a plane can be ensured to be zero, and geometric structure information of the original point cloud is maintained, which has little impact on the performance of the applications such as recognition and automatic driving, and the regularized structure is quite friendly to further processing of the point cloud.

In another embodiment of the present disclosure, the two-dimensional structure may further be adjusted based on a point-to-point geometric distortion measure (D1) to obtain the regularized structure. In this way, both geometric distortion measure D1 and the quality of a point cloud model can be ensured.

In addition, the two-dimensional structure may further be adjusted based on a point-to-point (D1) and point-to-plane (D2) comprehensive distortion measure to obtain the regularized structure. In this way, an overall geometric distortion measure of D1 and D2 and the quality of the point cloud model can be ensured simultaneously.

Further, the two-dimensional structure may be adjusted based on a point-to-line geometric distortion measure to obtain the regularized structure. Based on statistics, the point-to-line geometric distortion measure is between the point-to-point distortion measure and the point-to-plane distortion measure, so that the overall geometric distortion of D1 and D2 and the quality of the point cloud model can be ensured simultaneously.

According to the point cloud data processing method provided in the present disclosure, an original inputted point cloud is subjected to regularization preprocessing, so that the point cloud presents regularized distribution in horizontal and vertical directions, which increases the correlation between the data, so as to facilitate further processing of the point cloud data. In addition, when the regularization processing is performed, regularization preprocessing in the horizontal direction is performed by using a geometric distortion measure, which ensures the quality of the point cloud model.

Embodiment 2

Figure 7:
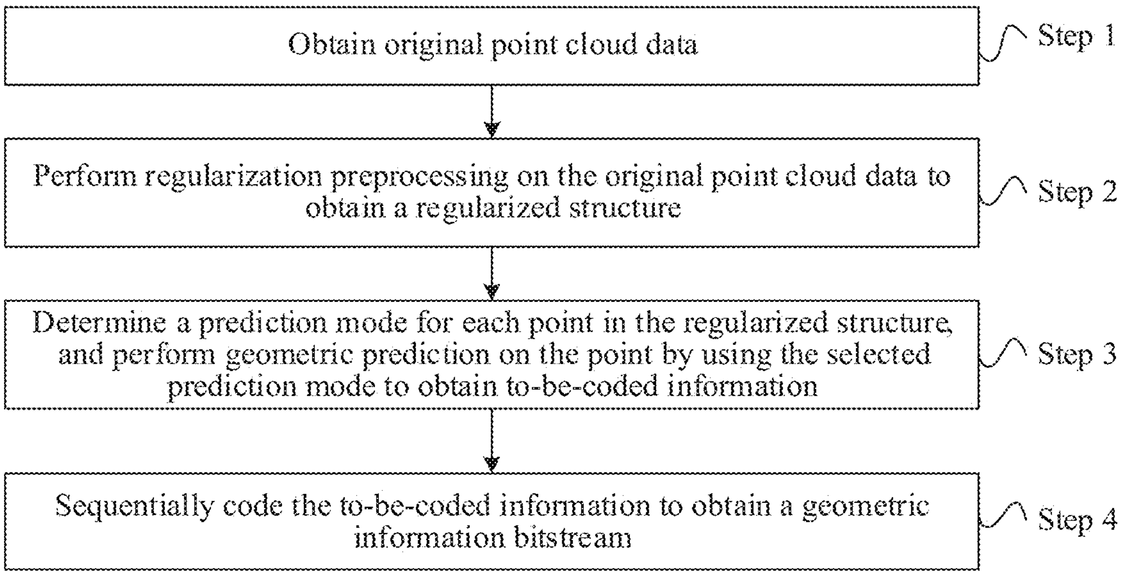
FIG. 7 is a schematic diagram of a point cloud geometry coding method according to an embodiment of the present disclosure.

FIG. 7 is a schematic diagram of a point cloud geometry coding method according to an embodiment of the present disclosure, and the method includes the following steps:

Step 1: Obtain original point cloud data.

In this embodiment, the original point cloud data is represented by Cartesian coordinates as (x,y,z).

Step 2: Perform regularization preprocessing on the original point cloud data to obtain a regularized structure.

Specifically, the preprocessing method provided in the foregoing Embodiment 1 may be used to perform regularization preprocessing on the original point cloud data to obtain the regularized structure.

More specifically, after the regularization processing, cylindrical coordinates (x,y,z) are converted into a regular (r,j,i) structure.

Step 3. Determine a prediction mode for each point in the regularized structure, and perform geometric prediction on each point by using the selected prediction mode to obtain to-be-coded information.

First, establish a prediction tree structure based on lidar calibration information.

Then, select a prediction mode for a current node according to the prediction tree structure.

In this embodiment, the established prediction tree is traversed in depth-first order, and each node in the tree can only be predicted by an ancestor thereof.

Further, this embodiment provides the following four prediction modes:

Mode0: No prediction

Mode1: Delta prediction (that is, p0)

Mode2: Linear prediction (that is, 2p0−p1)

Mode3: Parallelogram prediction (that is, p0+p1−p2), where p0, p1, and p2 are positions of a parent node, a grandparent node, and a great-grandparent node of the current node respectively. A best prediction mode may be selected for the current node based on the reconstruction quality, to perform a prediction.

Then, geometric prediction is performed on each point in the prediction tree structure according to the selected prediction mode, to obtain a geometric predicted residual of each point. In this embodiment, the geometric prediction includes cylindrical coordinate prediction and Cartesian coordinate prediction. A specific process is as follows.

Cylindrical coordinates (r,j,i) of a current node is predicted according to a type of the current node and the selected prediction mode, to obtain a predicted value (r',j',i') and a predicted residual $(r_r,r_j,r_i)$ of the current node in a cylindrical coordinate system.

If the current node is a root node of the prediction tree, Mode0 is selected as the prediction mode, that is, there is no prediction for the cylindrical coordinates of the current node, and corresponding predicted cylindrical coordinates are $(r_{min},j_{prev},i_{prev})$ where $r_{min}$ is the minimum value of an r component obtained after coordinate conversion of the entire point cloud. If the current node has no parent node, the value of $j_{prev},i_{prev}$ is 0, otherwise it is cylindrical coordinate component of a parent node. Predicted Cartesian coordinates are $(\hat{x},\hat{y},\hat{z})$ obtained by inverse conversion of cylindrical coordinates (r,j,i) of the point.

If the current node is not a root node, and Mode1 is selected as the prediction mode, cylindrical coordinates of the current node are predicted according to cylindrical coordinates ($r_{min}$,$j_{prev}$,$i_{prev}$) of a parent node thereof, so that predicted cylindrical coordinates (r',j',i') of the current node can be obtained, and predicted Cartesian coordinates are ($\hat{x}$,$\hat{y}$,$\hat{z}$) obtained by inverse conversion of original cylindrical coordinates (r,j,i).

If the current node is not a root node, and Mode2 or Mode3 is selected as the prediction mode, cylindrical coordinates of the current node are predicted in a corresponding prediction manner, so that predicted cylindrical coordinates of the current node can be obtained as (r',j',i'). Similarly, predicted Cartesian coordinates are ($\hat{x}$,$\hat{y}$,$\hat{z}$) obtained by inverse conversion of original cylindrical coordinates (r,j,i).

The best prediction mode for the current node is used to predict the cylindrical coordinates (r,j,i) of the current node, to obtain a predicted residual ($r_r$,$r_j$,$r_i$) in a cylindrical coordinate system.

It should be noted that a predicted value j' of an azimuth angle of the current node is calculated according to the following formula:

$$j'=j_{prev}+n,$$

where $j_{prev}$ represents a predicted azimuth angle of the current node, n represents a quantity of points that need to be skipped between a parent node and the current node according to a scanning speed. If a Laser (laser scanner) of the current node is i, and coding and decoding of a node with a Laser i+1 that is adjacent to the current node has been completed, the parameter n can further use a corresponding position node n' with the Laser i+1 for difference prediction, to obtain a predicted residual of the quantity of the points that need to be skipped, that is $\hat{n}$=n−n'.

In addition, in this embodiment, when geometry predictive coding is performed based on the regularized structure, coding and decoding are sequentially performed based on each Laser. Therefore, a coded node j component with a Laser i is needed to be temporarily stored for predicting a node j component at a position corresponding to a coding Laser i+1−N.

Difference prediction is performed by using the Cartesian coordinates (x,y,z) and the predicted Cartesian coordinates ($\hat{x}$,$\hat{y}$,$\hat{z}$) of the current node to obtain a predicted residual ($r_x$,$r_y$,$r_z$) in a Cartesian coordinate system.)

Finally, the predicted residual ($r_r$,$r_j$,$r_i$) in the cylindrical coordinate system, the predicted residual ($r_x$,$r_y$,$r_z$) in the Cartesian coordinate system, the predicted residual $\hat{n}$ of the points that need to be skipped, and other parameters that need to be coded, such as one of information among a quantity of child nodes of the current node, a prediction mode for the current node and other information, are used as to-be-coded information.

Step 4: Sequentially code the to-be-coded information to obtain a geometric information bitstream.

Specifically, for the to-be-coded information of each node, first, the quantity of child nodes of the current node needs to be coded, and second, the prediction mode for the) current node, the predicted residual ($r_r$,$r_j$,$r_i$) the predicted residual ($r_x$,$r_y$,$r_z$) respectively corresponding to the current node, and the predicted residual $\hat{n}$ of the points that need to be skipped are coded.

In this case, the geometry predictive coding of the point cloud is completed.

According to the point cloud geometry coding method provided in this embodiment, an original inputted point cloud is subjected to regularization processing, so that the point cloud presents regularized distribution in horizontal and vertical directions, which increases the correlation between data and improves coding efficiency. In addition, due to the regularization processing in the direction of the azimuth angle of the point cloud, there is no need to use additional bitstreams to code auxiliary information in the direction of the azimuth angle upon coding, which saves bitstreams and improves coding efficiency.

In this embodiment, when geometry coding is performed on a regularized point cloud, horizontal and vertical directions are combined by effectively utilizing a regularized structure, to perform predictive coding, thereby improving geometry coding efficiency.

In another embodiment of the present disclosure, in step 3, an existing predictor-based geometry coding mode may be alternatively used to convert Cartesian coordinates (x,y,z) into cylindrical coordinates (r,φ,i), and then prediction is performed to obtain predicted values ($\hat{r}$,$\hat{\phi}$,$\hat{i}$) and ($\hat{x}$,$\hat{y}$,$\hat{z}$), and predicted residuals ($r_r$,$r_\phi$,$r_z$) and ($r_x$,$r_y$,$r_z$). In addition, a lossless coding manner is used to code a quantity n of skipped points corresponding to a component φ, and a specific process is not described in detail herein.

Embodiment 3

Based on the foregoing Embodiment 2, a mode switch can further be set to determine whether to initialize original point cloud data in the entire coding process.

Specifically, geom_enable_regular_flag is introduced to a gps (Geometry parameter set syntax) parameter set to determine whether the geometry enables a regularization preprocessing scheme of the present disclosure in the entire coding. When geom_enable_regular_flag is 1, it means enabling; otherwise, it means disabling. See attached table 1 for details.

When the regularization preprocessing scheme is enabled, the point cloud data can be preprocessed first by using the point cloud data preprocessing method provided in the foregoing Embodiment 1, and then predictive coding is performed on the point cloud data by using the coding scheme provided in the Embodiment 2 or an existing geometry predictive coding method, so as to improve coding efficiency.

When the regularization preprocessing scheme is disabled, the prediction method provided in the foregoing Embodiment 2 may be directly used to predict and code the original point cloud data.

Embodiment 4

Figure 8:
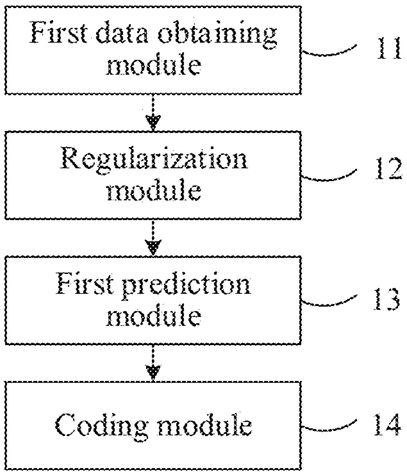
FIG. 8 is a schematic structural diagram of a point cloud geometry coding apparatus according to an embodiment of the present disclosure.

Based on the foregoing Embodiment 2, this embodiment provides a point cloud geometry coding apparatus. FIG. 8 is a schematic structural diagram of a point cloud geometry coding apparatus according to an embodiment of the present disclosure, and the apparatus includes:

- a first data obtaining module 11, configured to obtain original point cloud data;
- a regularization module 12, configured to perform regularization preprocessing on the original point cloud data to obtain a regularized structure;
- a first prediction module 13, configured to determine a prediction mode for each point in the regularized structure, and perform geometric prediction on each point by using the selected prediction mode to obtain to-be-coded information; and
- a coding module 14, configured to sequentially code the to-be-coded information to obtain a geometric information bitstream.

The apparatus provided in this embodiment can implement the coding method provided in the foregoing Embodiment 2, and a specific implementation process is not described herein again.

Embodiment 5

Figure 9:
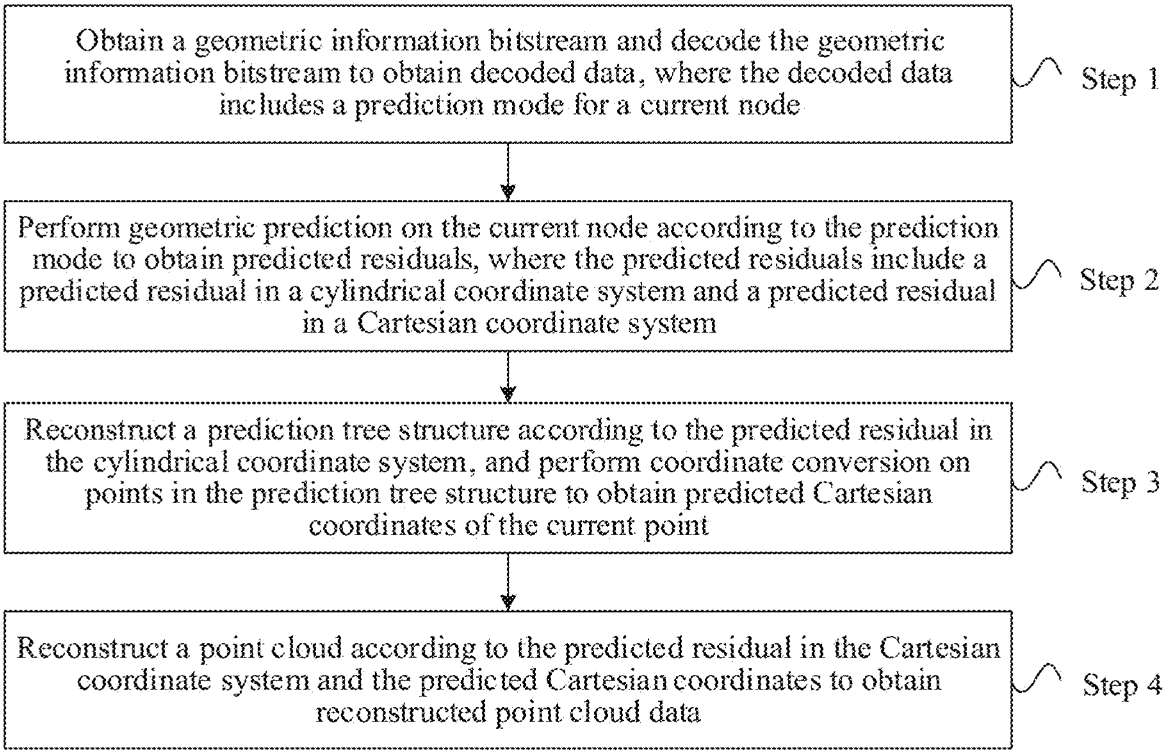
FIG. 9 is a schematic diagram of a point cloud geometry decoding method according to an embodiment of the present disclosure.

FIG. 9 is a schematic diagram of a point cloud geometry decoding method according to an embodiment of the present disclosure, and the method includes:

Step 1: Obtain a geometric information bitstream and decode the geometric information bitstream to obtain decoded data, where the decoded data includes a prediction mode for a current node.

Step 2: Perform geometric prediction on the current node according to the prediction mode to obtain predicted residuals, where the predicted residuals include a predicted residual in a cylindrical coordinate system and a predicted residual in a Cartesian coordinate system.

Based on the prediction mode for the current node that is obtained by decoding and reconstructed cylindrical coordinates of an ancestor thereof, cylindrical coordinates of the current node are predicted and a corresponding predicted value is generated. A specific process is as follows.

If the current node is a root node of the prediction tree, Mode0 is selected as the prediction mode, that is, there is no prediction for the cylindrical coordinates of the current node, and corresponding predicted cylindrical coordinates are $(r_{min}, j_{prev}, i_{prev})$, where $r_{min}$ is the minimum value of an r component obtained after coordinate conversion of the entire point cloud. If the current node has no parent node, the value of $j_{prev}, i_{prev}$ is 0, otherwise it is cylindrical coordinate component of a parent node. Predicted Cartesian coordinates are $(\hat{x},\hat{y},\hat{z})$ obtained by inverse conversion of original cylindrical coordinates (r,j,i) of the point.

If the current node is not a root node, and Mode1 is selected as the prediction mode, cylindrical coordinates of the current node are predicted according to cylindrical coordinates $(r_{min}, j_{prev}, i_{prev})$ of a parent node thereof, so that predicted cylindrical coordinates) (r',j',i') of the current node can be obtained, and predicted Cartesian coordinates are $(\hat{x},\hat{y},\hat{z})$ obtained by inverse conversion of original cylindrical coordinates (r,j,i).

If the current node is not a root node, and Mode2 or Mode3 is selected as the prediction mode, cylindrical coordinates of the current node are predicted in a corresponding prediction manner, so that predicted cylindrical coordinates of the current node can be obtained as (r',j',i'). Similarly, predicted Cartesian coordinates are $(\hat{x},\hat{y},\hat{z})$ obtained by inverse conversion of original cylindrical coordinates (r,j,i).

The best prediction mode for the current node is used to predict cylindrical coordinates (r,j,i) in of the current node, to obtain a predicted residual $(r_r, r_j, r_i)$ in a cylindrical coordinate system.

Same as a coding side, it should be noted that a predicted value j' of an azimuth angle of the current node is calculated according to the following formula:

$$j'=j_{prev}+n,$$

where $j_{prev}$ represents a predicted azimuth angle of the current node; and n represents a quantity of points that need to be skipped between a parent node and the current node according to a scanning speed. Note that if a laser of the current node is i, and coding and decoding of a node with a Laser i+1 that is adjacent to the current node has been completed, the parameter n is obtained by restoring the node n' at a position corresponding to the Laser i−1, that is n=n̂+n'.

In this case, the predicted residual in the cylindrical coordinate system, the predicted residual of the points that need to be skipped, and the predicted residual in the Cartesian coordinate system are obtained.

Step 3: Reconstruct a prediction tree structure according to the predicted residual in the cylindrical coordinate system, and perform coordinate conversion on points in the prediction tree structure to obtain predicted Cartesian coordinates of the current node.

Specifically, a cylindrical coordinate residual $(r_r, r_j, r_i)$ obtained by decoding and predicted cylindrical coordinates (r',j',i') of the current node are used to calculate reconstructed cylindrical coordinates (r,j,i) of the current node:

$$(r,j,i)=(r',j',i')+(r_r,r_j,r_i)$$

After obtaining the reconstructed cylindrical coordinates of the current node, the position of the current node in the prediction tree can be further determined according to the reconstructed cylindrical coordinates (r,j,i), so as to reconstruct the prediction tree.

The reconstructed cylindrical coordinates (r,j,i) of the current node is converted into the Cartesian coordinates $(\hat{x},\hat{y},\hat{z})$ according to the following formula, and $(\hat{x},\hat{y},\hat{z})$ is the predicted Cartesian coordinates of the current node.

$$\varphi=j\times\varphi_{sample}-180$$

$$\hat{x}=r\cdot cos\ \varphi$$

$$\hat{y}=r\cdot sin\ \varphi$$

$$\hat{z}=r\times\tan(\theta(i))-z\text{Laser}(i),$$

where i is a LaserID corresponding to the point. Prior information of each Laser is different, that is, an elevation angle θ and a height zLaser in the vertical direction are different. Therefore, an elevation angle corresponding to the i-th Laser is θ(i), and the height in the vertical direction is zLaser(i).

Step 4: Reconstruct a point cloud according to the predicted residual in the Cartesian coordinate system and the predicted Cartesian coordinates to obtain reconstructed point cloud data.

According to the following formula, a Cartesian coordinate residual $(r_x, r_y, r_z)$ obtained by decoding and predicted Cartesian coordinates $(\hat{x},\hat{y},\hat{z})$ of the current node are used to calculate reconstructed Cartesian coordinates (x,y,z) of the current node:

$$(x,y,z)=(\hat{x},\hat{y},\hat{z})+(r_x,r_y,r_z)$$

In this case, the decoding of the point cloud is completed, and a reconstructed voxelized point cloud is obtained.

Embodiment 6

Figure 10:
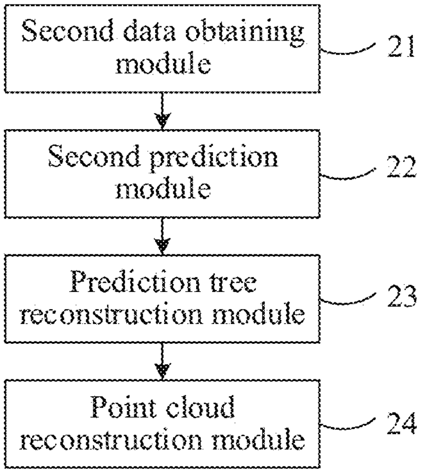
FIG. 10 is a schematic structural diagram of a point cloud geometry decoding apparatus according to an embodiment of the present disclosure.

Based on the foregoing Embodiment 5, this embodiment provides a point cloud geometry decoding apparatus. FIG. 10 is a schematic structural diagram of a point cloud geometry decoding apparatus according to an embodiment of the present disclosure, and the apparatus includes:

a second data obtaining module 21, configured to obtain a geometric information bitstream and decode the geometric information bitstream to obtain decoded data, where the decoded data includes a prediction mode for a current node;

a second prediction module 22, configured to perform geometric prediction on the current node according to the prediction mode to obtain predicted residuals, where the predicted residuals include a predicted residual in a cylindrical coordinate system and a predicted residual in a Cartesian coordinate system;

a prediction tree reconstruction module 23, configured to reconstruct a prediction tree structure according to the predicted residual in the cylindrical coordinate system, and perform coordinate conversion on points in the prediction tree structure to obtain predicted Cartesian coordinates of the current node; and a point cloud reconstruction module 24, configured to reconstruct a geometric point cloud according to a geometric predicted value of the current node and the predicted residual to obtain reconstructed point cloud data.

The apparatus provided in this embodiment can implement the decoding method provided in the foregoing Embodiment 4, and a specific implementation process is not described herein again.

The foregoing contents are detailed descriptions of the present disclosure with reference to specific exemplary embodiments, and it should not be considered that the specific implementation of the present disclosure is limited to these descriptions. A person of ordinary skill in the art to which the present disclosure belongs can further make simple deductions or replacements without departing from the concept of the present disclosure, and such deductions or replacements should all be considered as falling within the protection scope of the present disclosure.

TABLE 1

Geometry parameter set syntax

| | Descriptor |
|---|---|
| geometry__parameter__set( ) { | |
| gps__geom__parameter__set__id | u(4) |
| gps__seq__parameter__set__id | u (4) |
| gps__gsh__box__log2__scale__present__flag | u(1) |
| geom__enable__regular__flag | u(1) |
| if( !gps__gsh__box__log2__scale__present__flag) | |
| gps__gs__box__log2__scale | ue(v) |
| geom__tree__type | u(1) |
| if( geom__tree__type == 1 ) | |
| unique__geometry__points__flag | u(1) |
| if( geom__tree__type == 0 ) { | |
| geom__num__points__list__present__flag | u(1) |
| unique__geometry__points__flag | u(1) |
| inferred__direct__coding__mode | u(2) |
| if( inferred__direct__coding__mode ) | |
| joint__2point__idcm__enabled__flag | u(1) |
| geom__tree__coded__axis__list__present__flag | u(1) |
| log2__neighbour__avail__boundary__minus1 | u(3) |
| if ( log2__neighbour__avail__boundary__minus1 > 0 ) { | |
| adjacent__child__contextualization__enabled__flag | u(1) |
| log2__intra__pred__max__node__size | ue(v) |
| } | |
| bitwise__occupancy__coding__flag | u(1) |
| geometry__planar__enabled__flag | u(1) |
| if( geometry__planar__enabled__flag ){ | |
| geom__planar__th[ 0 ] | ue(v) |
| geom__planar__th[ 1 ] | ue(v) |
| geom__planar__th[ 2 ] | ue(v) |
| if( inferred__direct__coding__mode ) | |
| geom__idcm__rate__minus1 | u(5) |
| } | |
| } | |
| geometry__angular__enabled__flag | u(1) |
| if( geometry__angular__enabled__flag ){ | |
| geom__slice__angular__origin__present__flag | u(1) |
| if( !geom__slice__angular__origin__present__flag ) { | |
| geom__angular__origin__bits__minus1 | ue(v) |
| for( k = 0; k < 3; k++ ) | |

TABLE 1-continued

Geometry parameter set syntax

| | Descriptor |
|---|---|
| geom__angular__origin__xyz[ k ] | s(v) |
| } | |
| if( geom__tree__type == 1 ) { | |
| geom__angular__azimuth__scale__log2 | ue(v) |
| geom__angular__azimuth__step__minus1 | ue(v) |
| geom__angular__radius__scale__log2 | ue(v) |
| } | |
| number__lasers__minus1 | ue(v) |
| laser__angle__init | se(v) |
| laser__correction__init | se(v) |
| if( geom__tree__type = = 0 ) | |
| laser__phi__per__turn__init__minus1 | ue(v) |
| for( i = 1; i <= number__lasers__minus1; i++ ) { | |
| laser__angle__diff[ i ] | se(v) |
| laser__correction__diff[ i ] | se(v) |
| if( geom__tree__type = = 0 ) | |
| laser__phi__per__turn__diff[ i ] | se(v) |
| } | |
| if( geometry__planar__enabled__flag ) | |
| planar__buffer__disabled__flag | u(1) |
| } | |
| geom__scaling__enabled__flag | u(1) |
| if( geom__scaling__enabled__flag ) { | |
| geom__base__qp | ue(v) |
| geom__qp__multiplier__log2 | u(2) |
| if( geom__tree__type = = 1 ) | |
| geom__qp__offset__intvl__log2 | ue(v) |
| else if( inferred__direct__coding__mode ) | |
| geom__direct__coding__mode__qp__offset | se(v) |
| } | |
| gps__extension__flag | u(1) |
| if( gps__extension__flag ) | |
| while( more__data__in__byte__stream( ) ) | |
| gps__extension__data__flag | u(1) |
| byte__alignment( ) | |
| } | |

What is claimed is:

1. A point cloud geometry decoding method, comprising:

obtaining a geometric information bitstream, wherein the geometric information bitstream corresponds to a regularized structure of original point cloud data, wherein the original point cloud data is represented by Cartesian coordinates, wherein the regularized structure comprises a regularized distribution in horizontal and vertical directions, and wherein the regularized structure is based on a point-to-point geometric distortion measure or a point-to-plane geometric distortion measure;

decoding the geometric information bitstream to obtain decoded data, wherein the decoded data comprises a prediction mode for a current node;

performing geometric prediction on the current node according to the prediction mode to obtain predicted residuals, wherein the predicted residuals comprise a predicted residual in a cylindrical coordinate system and a predicted residual in a Cartesian coordinate system;

reconstructing a prediction tree structure according to the predicted residual in the cylindrical coordinate system, and performing coordinate conversion on points in the prediction tree structure to obtain predicted Cartesian coordinates of the current node; and reconstructing a point cloud according to the predicted residual in the Cartesian coordinate system and the predicted Cartesian coordinates to obtain reconstructed point cloud data.

2. The point cloud geometry decoding method according to claim 1, wherein the reconstructing the prediction tree structure according to the predicted residual in the cylindrical coordinate system, and the performing the coordinate conversion on the points in the prediction tree structure to obtain the predicted Cartesian coordinates of the current node comprises:

calculating reconstructed cylindrical coordinates of the current node based on a cylindrical coordinate residual obtained by decoding and predicted cylindrical coordinates of the current node.

3. The point cloud geometry decoding method according to claim 1, wherein the reconstructing the point cloud according to the predicted residual in the Cartesian coordinate system and the predicted Cartesian coordinates to obtain the reconstructed point cloud data comprises:

calculating reconstructed Cartesian coordinates of the current node based on a Cartesian coordinate residual obtained by decoding and the predicted Cartesian coordinates of the current node.

4. A point cloud geometry decoding apparatus, comprising:

a processing device configured to:

obtain a geometric information bitstream, wherein the geometric information bitstream corresponds to a regularized structure of original point cloud data, wherein the original point cloud data is represented by Cartesian coordinates, wherein the regularized structure comprises a regularized distribution in horizontal and vertical directions, and wherein the regularized structure is based on a point-to-point geometric distortion measure or a point-to-plane geometric distortion measure;

decode the geometric information bitstream to obtain decoded data, wherein the decoded data comprises a prediction mode for a current node;

perform geometric prediction on the current node according to the prediction mode to obtain predicted residuals, wherein the predicted residuals comprise a predicted residual in a cylindrical coordinate system and a predicted residual in a Cartesian coordinate system;

reconstruct a prediction tree structure according to the predicted residual in the cylindrical coordinate system, and performing coordinate conversion on points in the prediction tree structure to obtain predicted Cartesian coordinates of the current node; and reconstruct a point cloud according to the predicted residual in the Cartesian coordinate system and the predicted Cartesian coordinates to obtain reconstructed point cloud data.

5. The point cloud geometry decoding apparatus according to claim 4, wherein the reconstructing the prediction tree structure according to the predicted residual in the cylindrical coordinate system, and the performing the coordinate conversion on the points in the prediction tree structure to obtain the predicted Cartesian coordinates of the current node comprises:

calculating reconstructed cylindrical coordinates of the current node based on a cylindrical coordinate residual obtained by decoding and predicted cylindrical coordinates of the current node.

6. The point cloud geometry decoding apparatus according to claim 4, wherein the reconstructing the point cloud according to the predicted residual in the Cartesian coordinate system and the predicted Cartesian coordinates to obtain the reconstructed point cloud data comprises:

calculating reconstructed Cartesian coordinates of the current node based on a Cartesian coordinate residual obtained by decoding and the predicted Cartesian coordinates of the current node.

* * * * *